(12) United States Patent
Jeong et al.

(10) Patent No.: US 12,051,790 B2
(45) Date of Patent: *Jul. 30, 2024

(54) BATTERY MODULE AND BATTERY PACK COMPRISING SAME

(71) Applicant: LG ENERGY SOLUTION, LTD., Seoul (KR)

(72) Inventors: Han Yong Jeong, Seoul (KR); Seog Jin Yoon, Chungcheongbuk-do (KR); Kun Joo Yang, Chungcheongbuk-do (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/132,350

(22) Filed: Apr. 7, 2023

(65) Prior Publication Data

US 2023/0246262 A1 Aug. 3, 2023

Related U.S. Application Data

(63) Continuation of application No. 16/759,922, filed as application No. PCT/KR2018/009783 on Aug. 24, 2018, now Pat. No. 11,646,464.

(30) Foreign Application Priority Data

Nov. 14, 2017 (KR) .................... 10-2017-0151793

(51) Int. Cl.
*H01M 10/6551* (2014.01)
*H01M 10/613* (2014.01)
(Continued)

(52) U.S. Cl.
CPC ..... *H01M 10/6551* (2015.04); *H01M 10/613* (2015.04); *H01M 10/615* (2015.04);
(Continued)

(58) Field of Classification Search
CPC .......... H01M 10/6551; H01M 10/613; H01M 10/615; H01M 10/643; H01M 50/209; H01M 50/581; H01M 50/557
See application file for complete search history.

(56) References Cited

U.S. PATENT DOCUMENTS

2011/0159339 A1 6/2011 Gregor et al.
2011/0287287 A1 11/2011 Kang
(Continued)

FOREIGN PATENT DOCUMENTS

CN 104995758 A 10/2015
CN 105206894 A 12/2015
(Continued)

OTHER PUBLICATIONS

First Office Action dated Dec. 20, 2022, issued in corresponding CN Patent Application No. 201880051953.7.
(Continued)

*Primary Examiner* — Brian R Ohara
*Assistant Examiner* — Emily Elizabeth Freeman
(74) *Attorney, Agent, or Firm* — Morgan, Lewis & Bockius LLP

(57) ABSTRACT

The present disclosure relates to a battery module and a battery pack including the same, and more particularly, to a battery module and a battery pack having the same, the battery module being formed in a heat transfer structure so that the temperatures of a plurality of battery cells are efficiently adjusted, and formed such that a heat transfer member is formed to have through holes so that the stability of the battery cells increases.

5 Claims, 9 Drawing Sheets

(51) Int. Cl.
*H01M 10/615* (2014.01)
*H01M 10/643* (2014.01)
*H01M 50/204* (2021.01)
*H01M 50/209* (2021.01)
*H01M 50/264* (2021.01)
*H01M 50/557* (2021.01)
*H01M 50/581* (2021.01)

(52) U.S. Cl.
CPC ....... *H01M 10/643* (2015.04); *H01M 50/204* (2021.01); *H01M 50/209* (2021.01); *H01M 50/264* (2021.01); *H01M 50/557* (2021.01); *H01M 50/581* (2021.01)

(56) References Cited

U.S. PATENT DOCUMENTS

| | | |
|---|---|---|
| 2011/0293986 A1 | 12/2011 | Kozu |
| 2012/0021260 A1 | 1/2012 | Yasui et al. |
| 2012/0183823 A1 | 7/2012 | Von Borek et al. |
| 2012/0231314 A1 | 9/2012 | Sohn |
| 2012/0263982 A1 | 10/2012 | Yasui et al. |
| 2013/0244077 A1 | 9/2013 | Palanchon et al. |
| 2014/0017540 A1* | 1/2014 | Miyawaki ............. H01M 50/55 429/99 |
| 2014/0234668 A1 | 8/2014 | Sweney et al. |
| 2015/0180098 A1 | 6/2015 | Eckl et al. |
| 2015/0255225 A1 | 9/2015 | Kusuma et al. |
| 2015/0280295 A1 | 10/2015 | Bhunia et al. |
| 2015/0357614 A1 | 12/2015 | Sohn et al. |
| 2016/0204404 A1 | 7/2016 | Shimizu et al. |
| 2016/0285140 A1 | 9/2016 | Kimura |
| 2016/0285142 A1 | 9/2016 | Kimura |
| 2016/0301047 A1 | 10/2016 | Le Gall et al. |
| 2017/0047625 A1 | 2/2017 | Bhunia et al. |
| 2017/0214033 A1 | 7/2017 | Takano et al. |
| 2017/0309869 A1 | 10/2017 | Kim et al. |
| 2017/0309980 A1 | 10/2017 | Hong et al. |

FOREIGN PATENT DOCUMENTS

| | | |
|---|---|---|
| CN | 106654440 A | 5/2017 |
| CN | 107112461 A | 8/2017 |
| CN | 206471369 U | 9/2017 |
| JP | 2009-146605 A | 7/2009 |
| JP | 2012-150977 A | 8/2012 |
| JP | 5041184 B2 | 10/2012 |
| JP | 2014-2850 A | 1/2014 |
| JP | 2015-138589 A | 7/2015 |
| JP | 2016-178063 A | 10/2016 |
| KR | 10-1282520 B1 | 7/2013 |
| KR | 10-2013-0100324 A | 9/2013 |
| KR | 10-1301559 B1 | 9/2013 |
| KR | 10-2016-0113970 A | 10/2016 |
| KR | 10-2017-0004172 A | 1/2017 |
| KR | 10-2017-0051817 A | 5/2017 |
| KR | 20170054755 A | 5/2017 |
| WO | 2015/64096 A1 | 5/2015 |

OTHER PUBLICATIONS

International Search Report issued in corresponding International Patent Application No. PCT/KR2018/009783, dated Dec. 4, 2018.
First Office Action dated Feb. 8, 2021, issued in corresponding Japanese Patent Application No. 2020-506332.
Partial Supplementary European Search Report, dated Sep. 14, 2020 issued in corresponding European Patent Application 18 87 9289.9.

* cited by examiner

[Fig. 1]
Prior Art
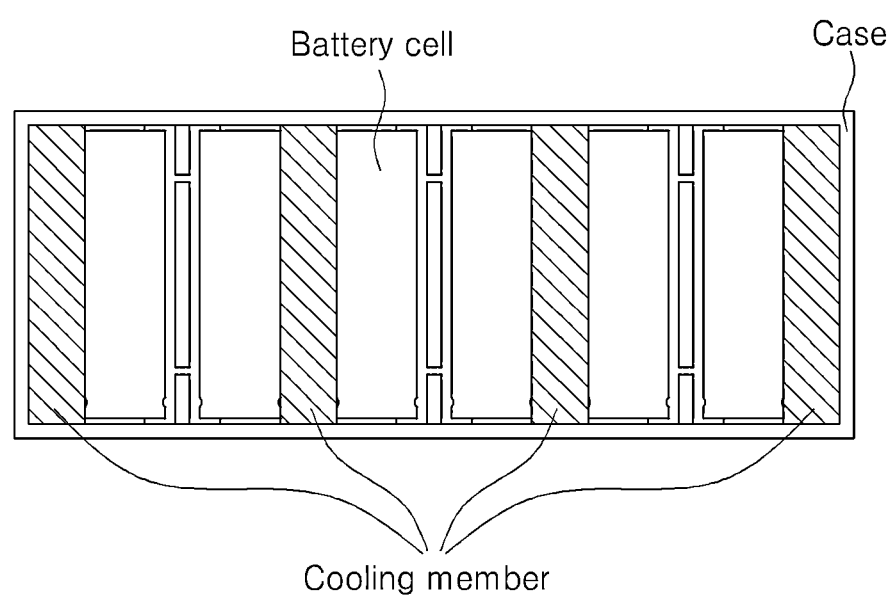

[Fig. 2]
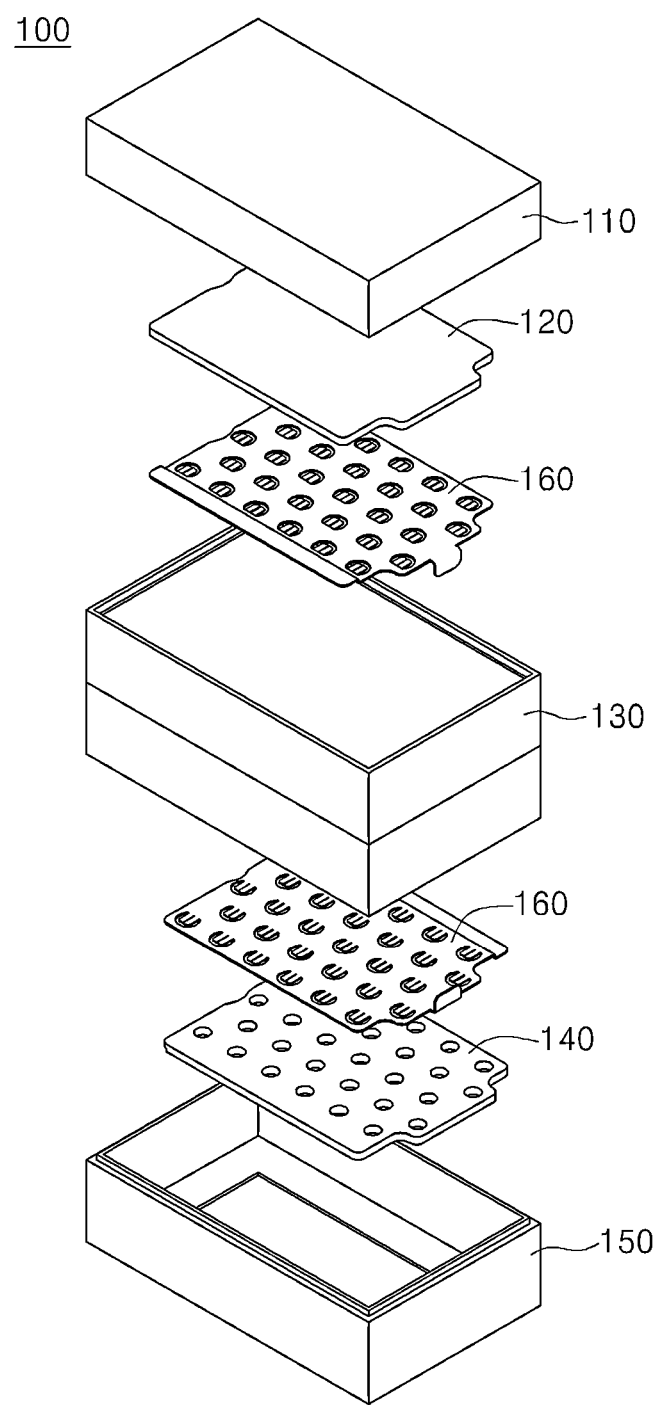

[Fig. 3]
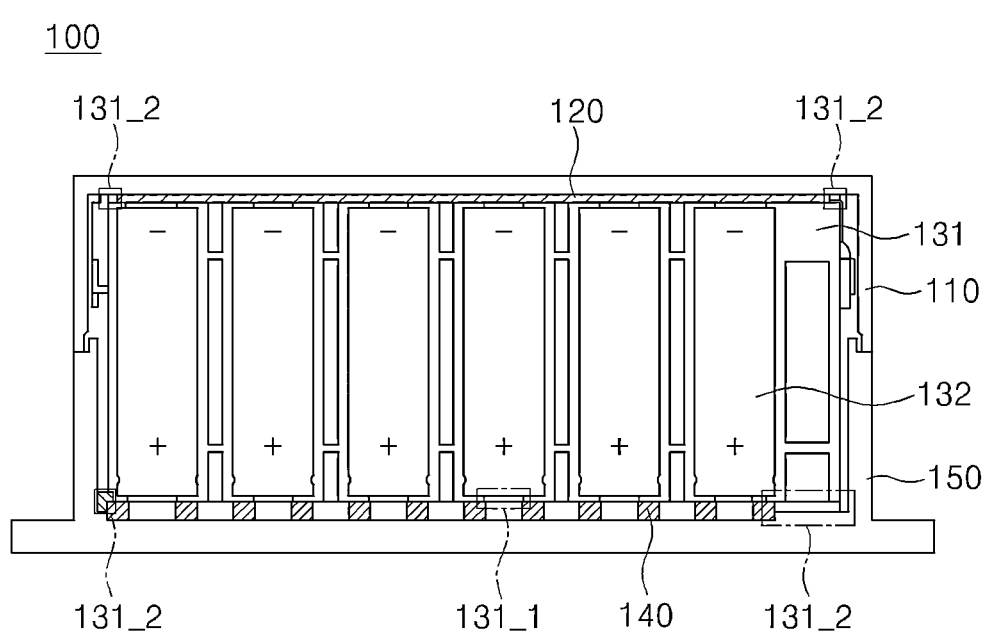

[Fig. 4]
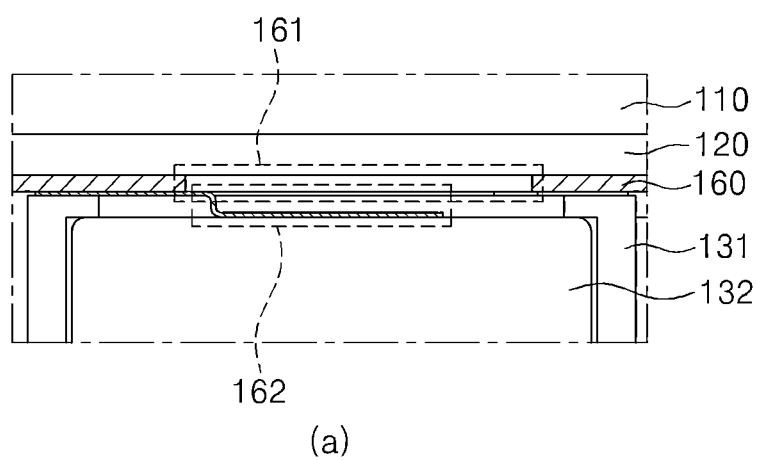
(a)
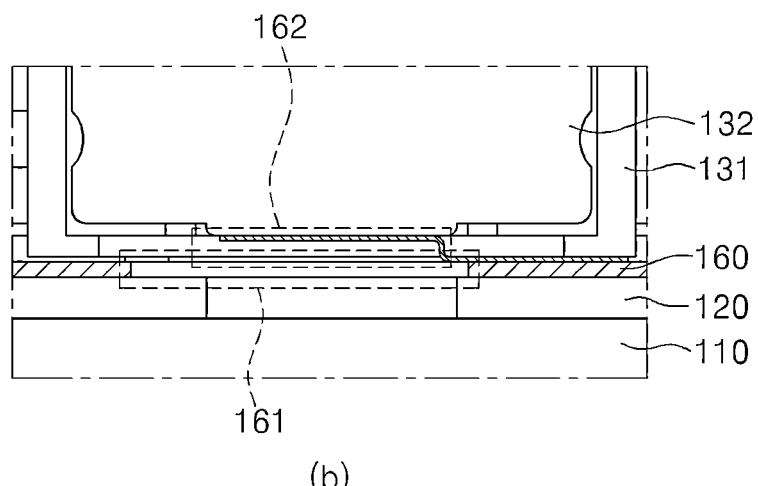
(b)

[Fig. 5]
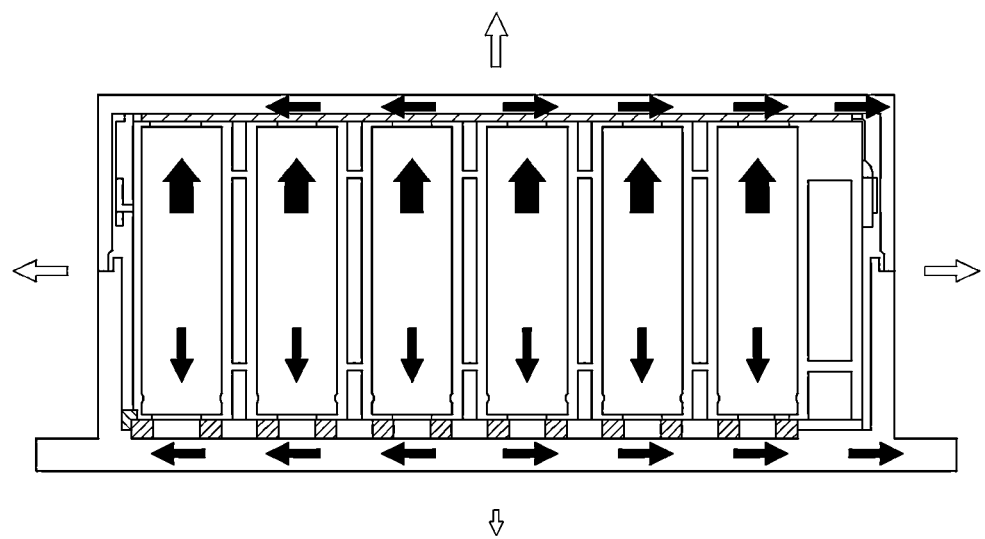

[Fig. 6]
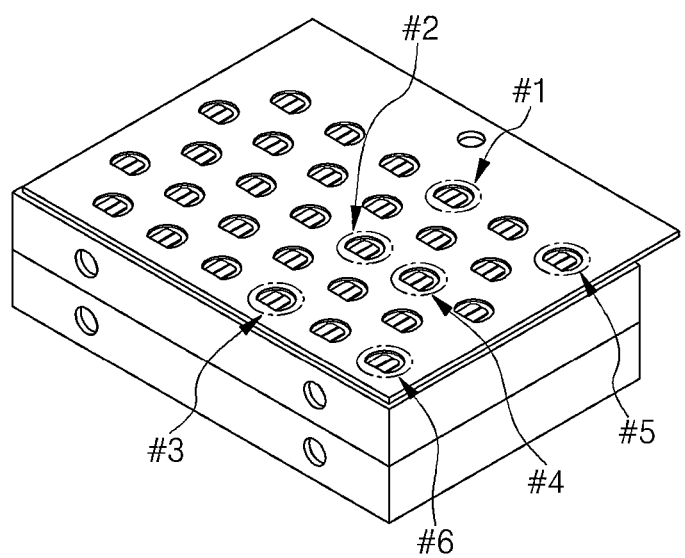
| Point | Temp. | avgTemp |
|---|---|---|
| #1 | 47.84 | |
| #2 | 49.82 | |
| #3 | 47.60 | 47 |
| #4 | 49.31 | |
| #5 | 43.09 | |
| #6 | 43.70 | |
(a)
| Point | Temp. | avg Temp |
|---|---|---|
| #1 | 45.91 | |
| #2 | 48.33 | |
| #3 | 44.62 | 46 |
| #4 | 48.16 | |
| #5 | 44.51 | |
| #6 | 44.71 | |
(b)

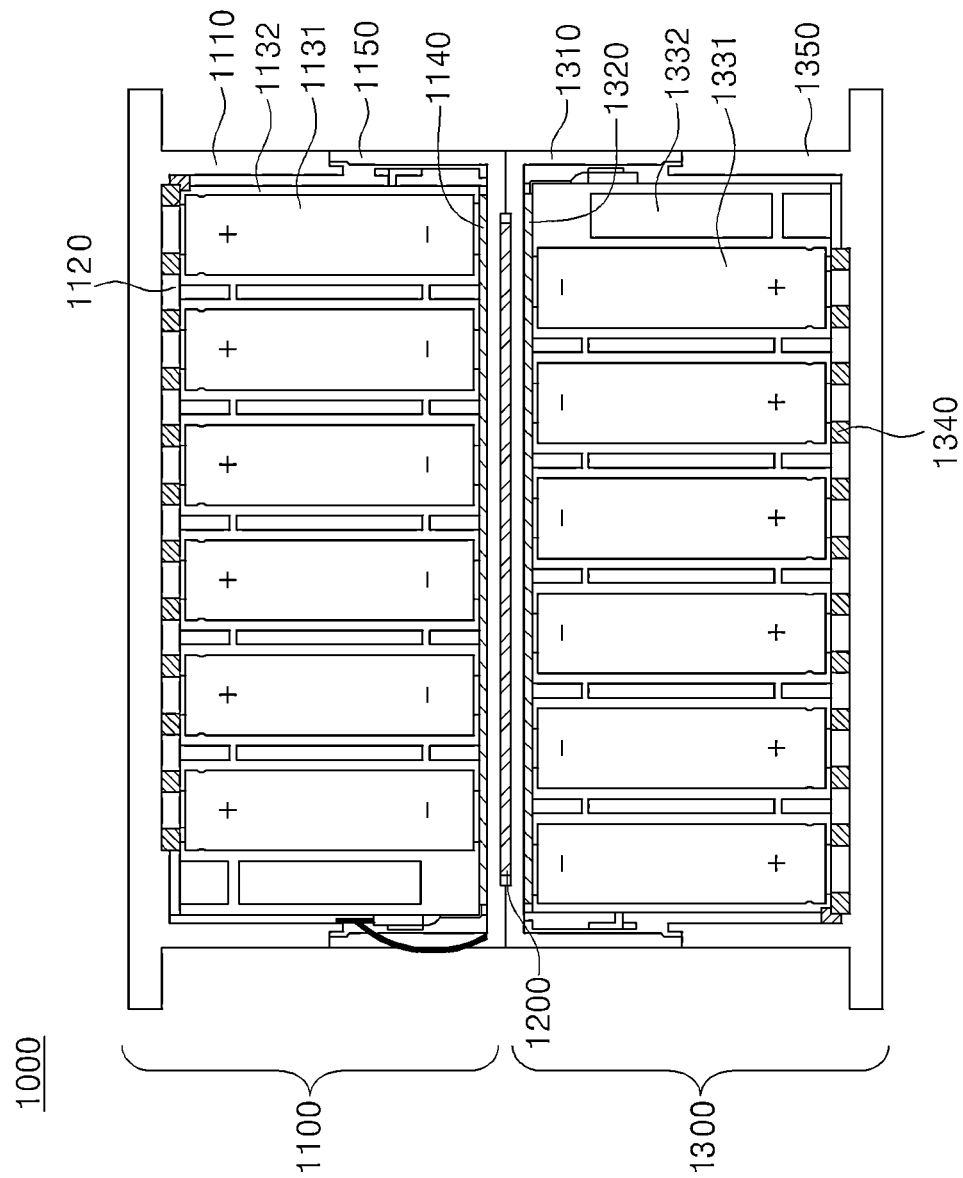

[Fig. 8]
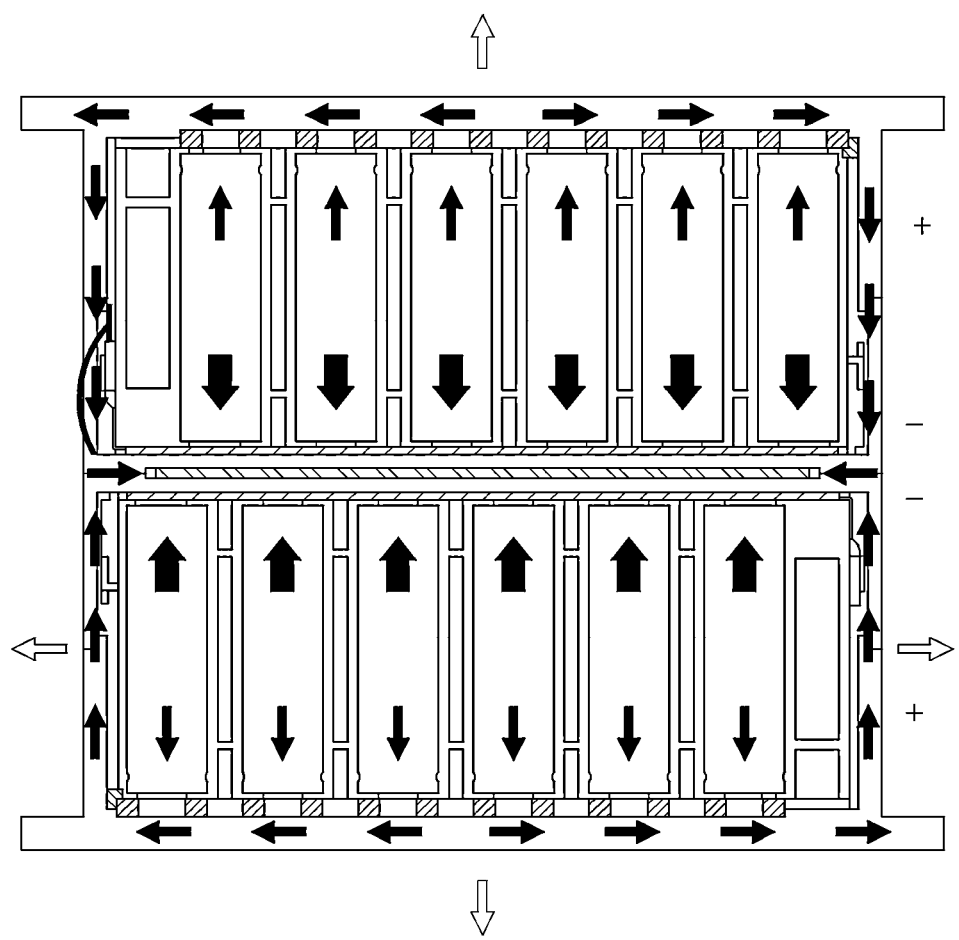

[Fig. 9]
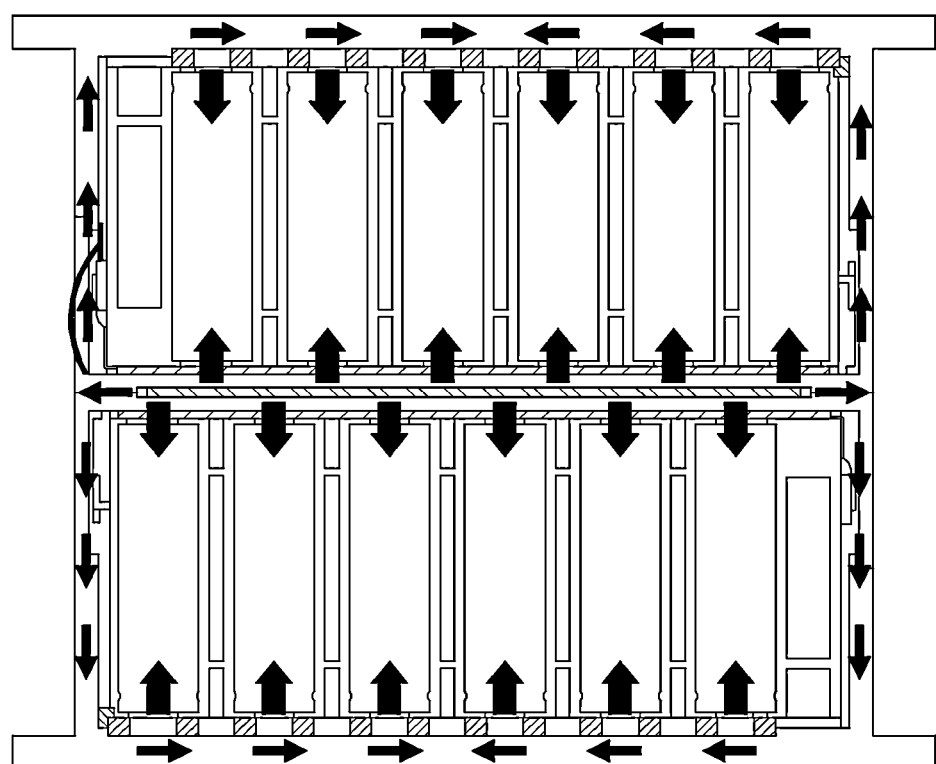

BATTERY MODULE AND BATTERY PACK COMPRISING SAME

CROSS-REFERENCE TO RELATED APPLICATIONS

This application is a Continuation of U.S. patent application Ser. No. 16/759,922, filed on Apr. 28, 2020, which is a National Stage Entry of International Patent Application No. PCT/KR2018/009783 filed on Aug. 24, 2018, the entireties of which are incorporated herein by reference.

TECHNICAL FIELD

The present disclosure relates to a battery module and a battery pack comprising the same, and more particularly, to a battery module and a battery pack comprising the same, the battery module being formed in a heat transfer structure so that the temperatures of a plurality of battery cells are efficiently adjusted, and formed such that a heat transfer member is formed to have through holes so that the stability of the battery cells increases.

BACKGROUND ART

The lithium secondary battery, as a unit cell constituting a battery pack, has flexibility, a relatively free shape, a small weight, and excellent safety, and thus has increasing demand as a power source for mobile electronic apparatuses, such as smart phones, camcorders, and laptop computers. Furthermore, the lithium secondary batteries have been widely used for medium and large scale apparatuses such as vehicles or power storage apparatuses as well as small-sized apparatuses such as portable electronic apparatuses.

Meanwhile, the types of the secondary batteries are classified according to the shapes of battery cases, and classified into cylindrical batteries and prismatic batteries when an electrode assembly is embedded in a cylindrical or prismatic metal can. In addition, when the electrode assembly is embedded in a pouch-type case formed of an aluminum laminate sheet, the secondary battery is classified into a pouch-type battery.

In addition, an electrode assembly embedded in a battery case is formed in a structure by a positive electrode, a negative electrode, and a separator inserted between the positive electrode and the negative electrode, and can thereby be charged/discharged. In addition, the shape of the cylindrical electrode assembly is formed in a jelly-roll type in which a positive electrode, a separator, and a negative electrode, which have long sheet-like shapes and are coated with an electrode active material, are sequentially laminated.

Meanwhile, in general, when using a battery pack for a long period of time, heat is generated in the battery pack. In particular, a large-capacity battery pack laminated as such accompanies more heat due to an increase in the amount of current during charge and discharge. If the heat generated at this point is not sufficiently removed, the performance of the battery pack is degraded, and furthermore, fire or explosion may also be caused.

To solve the above-mentioned problem, battery packs are provided with cooling members, and a battery pack provided with such a cooling member will be described in detail with reference to FIG. 1.

FIG. 1 is a structural view of an existing battery pack.

Referring to FIG. 1, an existing battery pack was provided with cooling members installed on each of the side surfaces of a plurality of cylindrical battery cells.

However, the above-mentioned structure of the battery pack has a problem in that as a plurality of cooling members are provided, the inside space of the battery pack is reduced, and since more heat is generated in the upper/lower portion of a cell in which electrode terminals are formed than on a side surface of the cell when driving the cylindrical cell, the cooling efficiency is reduced.

PRIOR ART DOCUMENT

[Patent Document]
(Patent document 1) KR2017-0004172A

DISCLOSURE OF THE INVENTION

Technical Problem

The present disclosure provides a battery module and a battery pack comprising the same, the battery module being provided with more battery cells in the same space and also increasing a cooling efficiency.

Technical Solution

In accordance with an exemplary embodiment, a battery module, formed by a plurality of battery cells, includes: an upper frame configured to transfer heat generated from the plurality of battery cells: an upper heat dissipation member located under the upper frame: a battery cell assembly which is located under the upper heat dissipation member and in which the plurality of battery cells having a structure in which a negative (−) electrode is positioned in an upper portion and a positive (+) electrode is located in a lower portion are arranged neighboring each other; a lower heat dissipation member located under the battery cell assembly and having a through hole at a position corresponding to an end portion of a positive electrode terminal of each battery cell: and a lower frame provided with a coupling part, which is located under the lower heat dissipation member and coupled to the upper frame, and configured to receive heat from the upper frame or transfer heat to the upper frame.

The battery cell assembly may further include a cell fixing frame configured to fix the plurality of battery cells.

The cell fixing frame may have heat dissipation member mounting grooves formed in an upper surface and a lower surface thereof so that the upper heat dissipation member and the lower heat dissipation member may be mounted at fixed positions.

The battery module may further include metal plates configured to come into contact with upper surfaces and lower surfaces of the plurality of battery cells inside the battery cell assembly and electrically connect the positive electrode terminals and the negative electrode terminals of the plurality of battery cells respectively.

The metal plates may have through holes at respective positions corresponding to the positive (+) electrode terminals and the negative (−) electrode terminals of the plurality of battery cells.

In accordance with another exemplary embodiment, a battery pack, which is formed for controlling heat between a plurality of battery modules formed by a plurality of battery cells, includes: a first battery module part formed as a structure in which a plurality of battery cells, in each of which a positive (+) electrode is located in an upper side and a negative (−) electrode is located in a lower side, are accommodated in a heat transfer frame: a temperature adjustment part located under the first battery module part and configured to control the temperatures of the plurality of battery cells; and a second battery module part which is located under the temperature adjustment part and in which a plurality of battery cells in each of which a negative (−) electrode is located in an upper side and a positive (+) electrode is located in a lower side, are accommodated in a heat transfer frame.

The first battery module part include: a first upper heat transfer frame configured to dissipate, to the outside, heat generated from the plurality of battery cells; a first upper heat dissipation member located between the first upper heat transfer frame and the plurality of battery cells and having through holes each formed at a position corresponding to an end portion of the positive (+) terminal of each battery cell; a first lower heat dissipation member located under the plurality of battery cells: and a first lower frame located under the first lower heat dissipation member and over the temperature adjustment part, connected to the first upper heat transfer frame to transfer heat transferred from the first upper heat transfer frame to the temperature adjustment part or to receive heat from the temperature adjustment part.

The second battery module part may include: a second upper heat transfer frame located under the temperature adjustment part to receive heat from the temperature adjustment part or to transfer heat generated from the plurality of battery cells to the temperature adjustment part: a second upper heat dissipation member located between the second upper heat transfer frame and the plurality of battery cells: a second lower heat dissipation member located under the plurality of battery cells and having a through hole at a position corresponding to an end portion of a positive (+) electrode terminal of each battery cell: and a second lower heat transfer frame located under the second lower heat dissipation member and connected to the second upper heat transfer frame to receive heat from the second upper heat transfer frame or to transfer heat to the second upper heat transfer frame.

Heat transfer frames of the first battery module part and the second battery module part may further have temperature adjustment part mounting grooves which have a predetermined depth and are formed in contact surfaces of the heat transfer frames contacting the temperature adjustment part so that the temperature adjustment part is installed inside the heat transfer frames.

The temperature adjustment part may be formed as a cooling member, a heating member or a configuration in which a cooling member and a heating member are combined.

Advantageous Effects

According to an exemplary embodiment, a battery module and a battery pack comprising the same increase the cooling efficiency of battery cells by arranging a heat dissipation member over/under the battery cells rather than on the side surfaces of the battery cells, and make it possible to safely drive the battery module and the battery pack in such a way that through holes are formed in the heat dissipation member in which the positive (+) electrode terminals of the battery cells are disposed and positive (+) electrode caps are opened when fire occurs, to thereby allow gas, flame, and discharged substances to be discharged.

BRIEF DESCRIPTION OF THE DRAWINGS

FIG. 1 is a structural view of an existing battery pack.

FIG. 2 is an exploded perspective view illustrating a battery module in accordance with an exemplary embodiment:

FIG. 3 is a side view of a battery module in accordance with an exemplary embodiment:

FIG. 4 is an enlarged side view of a battery module in accordance with an exemplary embodiment:

FIG. 5 is a heat transfer flow view of a battery module in accordance with an exemplary embodiment:

FIG. 6 is a view illustrating a temperature change in a battery module in accordance with an exemplary embodiment:

FIG. 7 is a side view of a battery pack in accordance with an exemplary embodiment:

FIG. 8 is a heat transfer flow view due to a cooling member inside a battery pack in accordance with an exemplary embodiment; and FIG. 9 is a heat transfer flow view due to a heating member inside a battery pack in accordance with an exemplary embodiment.

MODE FOR CARRYING OUT THE INVENTION

Hereinafter with reference to the features disclosed in the accompanying drawings, exemplary embodiments will be described in detail. However, the present disclosure is not restricted or limited by the exemplary embodiments. Rather, these embodiments are provided so that this disclosure will be thorough and complete, and will fully convey the scope of the inventive concept to those skilled in the art.

Although the terms such as "first" and "second" are used herein to describe various elements, these elements should not be limited by these terms. The terms are only used to distinguish one component from other components. For example, without departing from the scope of the present invention, a first component may be referred to as a second component, and similarly, the second component may also be referred to as the first component. In the following description, the technical terms are used only for explaining a specific exemplary embodiment while not limiting the present disclosure. The terms of a singular form may include plural forms unless referred to the contrary.

Terms used in the present invention is selected as general terms as widely used as possible while considering functions in the present invention, but these may be changed according to intent of a person skilled in the art, a precedent, an advent of new technique, or the like. In addition, in a specific case, there are terms arbitrarily selected by applicants, and in this case, the meaning of the terms will be described in detail in the corresponding description part of the present invention. Accordingly, the terms used in the present invention should be defined on the basis of the meanings the terms have and the contents of the entirety of the present invention rather than defined by simple names of the terms.

Example 1

Hereinafter a battery module in accordance with an exemplary embodiment will be described.

A battery module in accordance with an exemplary embodiment is accommodated inside a frame in which heat transfer is possible for a plurality of battery cells. In addition, the battery module is configured to include a heat dissipation member in which a plurality of through holes are formed so that when fire occurs, the cap of the positive (+) electrode terminal of each battery cell can be opened to discharge gas, flame, and discharged substances. Accordingly, in the battery module, heat generated from the battery cells can be quickly discharged, and when fire occurs, the caps are opened to allow the battery module to safely operate.

FIG. 2 is an exploded perspective view of a battery module in accordance with an exemplary embodiment.

Referring to FIG. 2, a battery module 100 in accordance with an exemplary embodiment includes: an upper frame 110 configured to transfer heat generated from a battery cell assembly 130; an upper heat dissipation member 120 located under the upper frame 110; a battery cell assembly 130 which is located under the upper heat dissipation member 120 and in which the plurality of battery cells each having a structure in which a negative (−) electrode is positioned in an upper portion and a positive (+) electrode is located in a lower portion are arranged neighboring each other: a lower heat dissipation member 140 located under the battery cell assembly 130 and having a through hole at a position corresponding to an end portion of a positive electrode terminal of each battery cell: and a lower frame 150 located under the lower heat dissipation member 140 and coupled to the upper frame 110 to receive heat from the upper frame 110 or to transfer heat to the upper frame 110.

Such a configuration of the battery module 100 will be described below in more detail.

The upper frame 110 and the lower frame 150 are components which transfer, to each other, heat generated from each of the electrodes of the plurality of battery cells and discharge the heat to the outside, and which may be formed of a material having a high heat conductive characteristic.

In an embodiment, aluminum can be used as the material, but the present disclosure is not limited thereto.

In addition, the upper frame 110 forms an upper end portion of the entire battery module, and the lower frame 150 forms a lower end portion of the entire battery module, which are components for protecting the inside of the battery module. In addition, the upper frame 110 and the lower frame 150 are provided with a coupling part on a side surface portion thereof so as to be coupled to each other.

Here, the coupling part may be formed such that one frame is formed in a "¬" shape and the other frame is formed in an "L" shape, but embodiments are not limited thereto, and the frames may be formed in various coupling forms.

In addition, in order to secure more space for the lower heat dissipation member 140, the lower frame 150 further has a heat dissipation member extension groove with a predetermined depth in a portion of the upper surface thereof.

At this point, the lower heat dissipation member 140 has a greater thickness than the thickness of the upper heat dissipation member 120, and has a thickness corresponding to a height formed by combination, which will be described below, of the heat dissipation member mounting groove 131-2 and the heat dissipation member extension groove.

The extended space formed as such may accommodate even more amount of flame, gas, and discharged substances discharged from the positive (+) terminal when fire occurs.

In addition, the upper heat dissipation member 120 and the lower heat dissipation member 140 are formed in shapes respectively contacting the upper frame 110 and the lower frame 150, whereby heat generated from the plurality of battery cells is quickly transferred to the upper frame 110 and the lower frame 150 and the heat are allowed to be discharged to the outside.

In addition, the upper heat dissipation member 120 and the lower heat dissipation member 140 are configured in pad shapes, and for example, when formed in a silicone pad, insulating property may also be secured, but embodiments are not limited thereto.

In addition, the upper heat dissipation member 120 is formed in a flat plate shape so as to cover the entire upper surfaces of the plurality of battery cells, and the lower heat dissipation member 140 has through holes at positions corresponding to end portions of the positive (+) electrodes of the plurality of battery cells.

If an abnormal state occurs in a battery cell and fire occurs, in order to prevent greater fire and explosion, the caps of the positive (+) terminals are opened by the pressure inside the battery cells, and gas, flame, and discharged substances are allowed to be discharged from the opened caps of the positive (+) electrodes via the through holes of the lower heat dissipation member 140.

In addition, the battery cell assembly 130 is located between the upper heat dissipation member 120 and the lower heat dissipation member 140, is configured such that the plurality of battery cells, each having a structure in which the negative (−) electrode is located in an upper side and the positive (+) electrode is located in a lower side, are arranged neighboring each other, and the battery cell assembly is formed in a shape contacting each of the upper heat dissipation member 120 and the lower heat dissipation member 140.

The configuration of the battery cell assembly 130 will be described in more detail with reference to FIG. 3.

FIG. 3 is a side view of a battery module in accordance with an exemplary embodiment.

Referring to FIG. 3, the battery cell assembly 130 is configured to further include a cell fixing frame 131 which fixes the plurality of battery cells 132.

In addition, the cell fixing frame 131 may be configured to be divided into an upper stage portion/a lower stage portion, and the upper stage portion and the lower stage portion are formed to have a similar coupling form to the coupling part of the upper frame 110 and the lower frame 150.

In addition, the battery cell assembly 130 includes a plurality of vertically communicating through grooves 131_1 so that one ends of the circular battery cells are inserted and fixed.

In addition, the through grooves 131_1 are each formed such that the diameter of a portion thereof contacting the end of the battery cell inserted thereinto is formed smaller than the diameter of the body of the circular battery cell so that the battery cell does not protrude to the outside.

However, due to the protective structure of the battery cell, the cap of the positive (+) electrode of the battery cell may also be opened when fire occurs in the battery cell. Therefore, the through grooves are formed to have at least a predetermined diameter range so that gas, flame, and discharged substances can be easily discharged.

In addition, the cell fixing frame 131 is formed to further include heat dissipating member mounting grooves 131_2 which is formed in a predetermined depth in the upper surface and the lower surface of the cell fixing frame so that the upper heat dissipating member 120 and the lower heat dissipating member 140 can be mounted at a fixed position.

Since the upper heat dissipating member 120 and the lower heat dissipating member 140 should be disposed over/under the plurality of battery cells 132, the heat dissipating member mounting grooves 131_2 are allowed to be easily arranged without a separate attachment member.

Since heat may be generated at the attachment position to which the attachment member is attached, heat dissipation efficiency may be decreased.

In addition, the battery cell used here means a cylindrical battery cell, and the cell fixing frame is formed of an insulating material.

Also, the battery module 100 is formed to further include metal plates 160 which respectively contact the upper surfaces and the lower surfaces of the plurality of battery cells inside the battery cell assembly 130 and electrically connect the positive electrodes and the negative electrodes of the plurality of battery cells, and this will be described in more detail with reference to FIG. 4.

FIG. 4 is an enlarged side view of a battery module in accordance with an exemplary embodiment.

Referring to FIG. 4, the metal plates 160 have through holes 161 at respective positions corresponding to the positive (+) electrode terminals and the negative (−) electrode terminals of the plurality of battery cells. More strictly describing, the through holes 161 are formed at the positions corresponding to the end portions of the electrode terminals, and connection terminals 162 formed inside the through holes contact the plurality of battery cells to electrically connect the battery cells.

Here, the through holes 161 are formed so that when fire occurs in the plurality of battery cells, gas, flame, and discharged substances may be discharged through the positive (+) electrodes of corresponding battery cells.

In addition, in general, since the heat generation amount at the negative (−) electrode of the battery cell becomes greater during charge/discharge through the connection terminals 162, the metal plate 160 and the plurality of battery cells 132 are allowed to be spaced apart a predetermined distance from each other by means of the through hole 161.

In addition, the metal plates 160 may be formed of a material such as copper, and the connection terminals 162 may be formed of nickel. As such, nickel which is easily welded is used for the connection terminals 162 and copper which is not suitable for resistance welding due to a low resistance thereof is used for the base of the metal plates, whereby heat may easily be discharged from the metal plate 160.

Also, the metal plates 160 are disposed together with the upper heat dissipating member 120 and the lower heat dissipating member 140 inside the heat dissipating member mounting grooves 131_2 of the cell fixing frame 131.

More specifically, the metal plate 160 is located between the lower portion of the upper heat dissipation member 120 and the upper portion of the plurality of battery cells 132 and between the lower portion of the plurality of battery cells 132 and upper portion of the lower heat dissipation member 140.

Accordingly, the metal plates may easily be disposed at fixed positions without a separate fixing component, and since the metal plates are formed to contact the heat dissipation members, heat transfer may occur more quickly.

In addition, the transfer flow of heat generated from the battery module 100 will be described in detail with reference to FIG. 5.

FIG. 5 is a heat transfer flow view of a battery module in accordance with an exemplary embodiment.

First, FIG. 5 shows a heat dissipation transfer path through which heat generated from the plurality of battery cells 132 is discharged to the outside, and much amount of heat is generated from the battery cell 132 during charge/discharge. Heat generated from the battery cells is transferred to the heat dissipation members 120 and 140 via the metal plates 160, and the heat dissipation member 120 and 140 quickly transfer heat to the frames 110 and 150.

Heat transferred to the frames 110 and 150 is discharged to the outside via the upper portion, lower portion, and both side surface portions of the frames 110 and 150.

The lower portions of the frames 110 and 150 and do not easily discharge the heat efficiently to the outside because being provided with a bottom surface. Therefore, the heat that could not be discharged downward is transferred to both side surface parts and may be discharged to the outside.

In addition, the upper portions of the frames 110 and 150 has more heat generation amount because negative (−) electrodes of the plurality of battery cells 132 are located in the upper portions, the heat that could not be discharged outside is transferred to both side surface parts and may be discharged to the outside.

This heat dissipation effect of the battery module in accordance with an exemplary embodiment will be described in more detail with reference to FIG. 6 which is a result of a charging experiment.

FIG. 6 is a view illustrating a temperature change in a battery module in accordance with an exemplary embodiment.

Referring to FIG. 6, in the present experiment, a total of 6 points among the positive (+) electrode terminals of the battery cells were measured at 1 C-rate. Since the temperatures of the six points could easily be measured as the lower heat dissipation member 140 of the battery module in accordance with an exemplary embodiment was perforated corresponding to ends of the positive (+) electrode terminals, the accurate temperature of each battery cell was measured through the positive (+) electrode terminal.

(a) of FIG. 6 shows temperature measurement values of a typical battery module, and (b) of FIG. 6 shows temperature measurement values of a battery module in accordance with an exemplary embodiment.

Comparing (a) of FIG. 6 and (b) of FIG. 6, (b) of FIG. 6 shows a generally lower temperature measurement values than (a) of FIG. 6, the average temperature in (a) of FIG. 6 is approximately 47° C. and the average temperature in (b) of FIG. 6 is approximately 46° C., and thus, it can be confirmed that heat generated from each battery cell is quickly discharged to the outside due to the structure of the battery module of the exemplary embodiment.

In addition, in the present experiment, the lower frame 150 which further facilitates the heat discharge is not disposed to accurately measure the temperature of the battery cell. Therefore, when the lower frame 150 is disposed, the temperature reducing effect will further increase.

Example 2

Next, a battery pack in accordance with an exemplary embodiment will be described.

A battery pack in accordance with an exemplary embodiment is provided with a temperature adjustment part which is formed between battery modules formed in a structure having high heat transfer efficiency and which controls the temperature of the battery modules. Thus, the temperatures of the two battery modules are allowed to be more efficiently maintained.

FIG. 7 is a side view of a battery pack in accordance with an exemplary embodiment.

Referring to FIG. 7, a battery pack 1000 in accordance with an exemplary embodiment includes: a first battery module part 1100 formed in a structure in which a plurality of battery cells having positive (+) electrodes located in an upper side thereof and negative (−) electrodes located in a lower side thereof are embedded in a heat transfer frame: a temperature adjustment part 1200 which is located under the first battery module part 1100 to control the plurality of battery cells; and a second battery module part 1300 formed in a structure in which a plurality of battery cells having negative (−) electrodes located in an upper side thereof and positive (+) electrodes located in a lower side thereof are embedded in a heat transfer frame.

Such a configuration of the battery pack 1000 will be described below in more detail.

In addition, the first battery module part 1100 is a component formed in a structure in which a plurality of battery cells having positive (+) electrodes located in an upper side thereof and negative (−) electrodes located in a lower side thereof are embedded in a heat transfer frame. More strictly describing, the first battery module part 1100 has the plurality of battery cells 1131 located between a first upper heat transfer frame 1110, a first upper heat dissipation member 1120, a first lower heat dissipation member 1140, and a first lower heat transfer frame 1150.

In addition, the first upper heat transfer frame 1110 is a component which discharges heat generated from the plurality of battery cells and forms the uppermost end of the entire battery module.

In addition, the first upper heat dissipation member 1120 is located between the first upper heat transfer frame 1110 and the plurality of battery cells 1131, and has through holes at positions each corresponding to the end portion of the positive (+) electrode of each battery cell.

Here, when fire occurs, the through holes allow flame and gas discharged from the insides of the battery cells to be discharged through the positive (+) electrode terminals.

In addition, the first upper heat dissipation member 1120 is allowed to be formed of flame-resistant and incombustible material so that flame generated from one battery cell is not spread to another battery cell.

In addition, the plurality of battery cells 1131 are components accommodated inside a cell fixing frame 1132, and the cell fixing frame 1132 is provided with, on the upper surface and the lower surface thereof, heat dissipation member mounting grooves which have a predetermined depth, and thus allows the upper heat dissipation member 1120 and the lower heat dissipation member 1140 to be mounted on fixed positions.

Here, the fixed positions mean positions which cover entire upper and lower surfaces of the plurality of battery cells 1131. Since not only the plurality of battery cells 1131 but also a BMS which controls the plurality of battery cells 1131 are disposed on a side surface inside the cell fixing frame 1132, the upper heat dissipation member 1120 and the lower heat dissipation member 1140 are allowed to be disposed at positions requiring heat dissipation.

In addition, the first lower heat dissipation member 1140 is located under the plurality of battery cells and transfers heat generated from the negative (−) electrode of the battery cell to the first lower heat transfer frame 1150.

Here, the first upper heat transfer member 1120 the first lower heat dissipation member 1140 are formed in flat plate-like pads and disposed on the heat dissipation member mounting grooves of the cell fixing frame 1132.

In addition, the plurality of battery cells 1131 further include metal plates which contact the upper surfaces and lower surfaces of the battery cells and electrically connect the positive electrode terminals and the negative electrode terminals. As the metal plates are disposed together in the heat dissipation member mounting grooves, the metal plates are located between the lower portion of the first upper heat dissipation member and the upper portion of the plurality of battery cells 1131, and between the lower portion of the plurality of battery cells 1131 and the upper portion of the first lower heat dissipation member 1140.

In addition, the first lower heat transfer frame 1150 is a component which is located under the first lower heat dissipation member 1140, is connected to the first upper heat transfer frame 1110, and transfers heat transferred from the first upper heat dissipation frame 1110 to the temperature adjustment part 1200, or receives heat generated from the temperature adjustment part 1200 and transfers to the plurality of battery cells 1131.

In addition, the first lower heat transfer frame 1150 also transfers heat generated from the plurality of battery cells 1131 to the temperature adjustment part 1200, so that the battery cells can be cooled.

In addition, in the lower surface of the first lower heat transfer frame 1150, a first temperature adjustment part mounting groove 1151 having a predetermined depth is formed in a contact surface of the heat transfer frame contacting the temperature adjustment part so the temperature adjustment part 1200 is disposed inside the frame body. Here, the predetermined depth is formed in a length of ½ of the height of the temperature adjustment part 1200, and allows the temperature adjustment part 1200 to be formed in one frame without a separate configuration and protected.

In addition, the temperature adjustment part 1200 is a component which is located under the first battery module part 1100, is located over the second battery module part 1300, and controls the temperatures of the plurality of battery cells in each battery module, and may be formed as a cooling member, a heating member, or a component in which a cooling member and a heating member are combined.

In addition, the cooling member is formed in a plate shape, uses a liquid cooler or a metal cooler, and has the outer portion formed of a heat conductive material, whereby heat is allowed to be quickly introduced from the outside or transferred to the outside.

In addition, the heating member is formed in a plate shape, uses a liquid heater or a metal heater, and has the outer portion formed of a heat conductive material, whereby heat is allowed to be quickly discharged or transferred to the outside.

In addition, the cooling member and the heating member are electrically connected to the BMS which controls the battery pack, and when the temperature of the battery pack exceeds a predetermined temperature, the cooling member is allowed to operate through the BMS, and when the temperature of the battery pack is less than a predetermined temperature, the heating member is allowed to operate through the BMS.

If the cooling member and the heating member are configured to be combined, the heating member functions as a heat transfer component when the cooling member operates, and when the heating member operates, the cooling member functions as a heat transfer component.

In addition, the second battery module part 1300 is a component located under the temperature adjustment part 1200 and formed in a structure in which a plurality of battery cells having negative (−) electrodes located in an upper side thereof and positive (+) electrodes located in a lower side thereof are embedded in a heat transfer frame. More strictly describing, the second battery module part has a plurality of battery cells 1331 located between a second upper heat transfer frame 1310, a second upper heat dissipation member 1320, a second lower heat dissipation member 1340, and a second lower heat transfer frame 1350.

In addition, the second upper heat transfer frame 1310 is a component which is located under the temperature adjustment part 1200 to receive heat from the temperature adjustment part 1200 or transfer the heat generated from the plurality of battery cells to the temperature adjustment part 1200. In addition, in the upper surface of the second upper heat transfer frame, a second temperature adjustment part mounting groove 1311 having a predetermined depth is formed in a contact surface of the heat transfer frame contacting the temperature adjustment part so that the temperature adjustment part 1200 is disposed inside the frame body.

Here, the predetermined depth is formed in a length of ½ of the height of the temperature adjustment part 1200, and allows the temperature adjustment part 1200 to be disposed in a region combined with the first temperature adjustment part mounting groove 1151 formed in the lower surface of the first lower heat transfer frame 1150.

In addition, the second upper heat transfer frame 1310 and the first lower heat transfer frame 1150 are further provided with a separate connection part so as to be connectable and fixable to each other.

In an embodiment, the coupling form of the connection part may be formed in a shape in which the connection part extends from the side surface of the heat transfer frame, and through holes are formed such that bolt and screw coupling is made, or may be formed as a recess and protrusion part in which protrusions that can be forcibly fitted to the upper surface and lower surface of each heat transfer frame, but the present disclosure is not limited thereto.

In addition, the second upper heat dissipation member 1320 is located between the second upper heat transfer frame 1310 and the plurality of battery cells 1331 and quickly transfers the heat generated from the negative (−) electrode terminals of the plurality of battery cells 1331 to the temperature adjustment part 1200.

In addition, the plurality of battery cells 1331 are components accommodated in a cell fixing frame 1332 and are the same as the configuration of the plurality of battery cells 1331 inside the first battery module part.

In addition, the second lower heat dissipation member 1340 is located under the plurality of battery cells 1331, and through holes are formed at positions each corresponding to the positive (+) electrode terminal of each battery cell.

Here, when fire occurs, the through holes allow flame and gas discharged from the insides of the battery cells to be discharged through the positive (+) electrode terminals.

In addition, the second lower heat dissipation member 1340 is allowed to be formed of flame-resistant and incombustible material so that flame generated from one battery cell is not spread to another battery cell.

In addition, the second upper heat dissipation member 1320 and the second lower heat dissipation member 1340 are formed in flat plate-like pads and disposed on the heat dissipation member mounting grooves of the cell fixing frame 1332.

In addition, the second lower heat transfer frame 1350 is a component which is located under the second lower heat dissipation member 1340 to receive heat from the second upper heat transfer frame 1310, or transfer the heat generated from the plurality of battery cells 1331 to the second upper heat transfer frame 1310.

In addition, a flow of heat transferred by the temperature adjustment part 1200 inside the battery pack 1000 will be described in detail with reference to FIGS. 8 and 9.

FIG. 8 is a heat transfer flow view due to a cooling member inside a battery pack in accordance with an exemplary embodiment.

FIG. 9 is a heat transfer flow view due to a heating member inside a battery pack in accordance with an exemplary embodiment.

First, FIG. 8 shows a heat dissipation transfer path through which heat generated from the plurality of battery cells 1131, 1331 is partially discharged to the outside while being transferred to the cooling member inside the temperature adjustment part 1200, and FIG. 9 shows a heat transfer path through which heat generated from the heating member is transferred to the first battery module part 1100 and the second battery module part 1300.

Referring to FIG. 8, during charge/discharge, much amount of heat is generated from each electrode terminal of the battery cells 1131 and 1331. This heat is transferred to the heat dissipation members 1120, 1140, 1320 and 1340 contacting each electrode terminal and is quickly transferred to the frames 1110, 1150, 1310, and 1350.

More specifically, heat generated from the negative (−) electrode of the plurality of battery cells 1131 inside the first battery module part 1100 and the negative (−) electrode of the plurality of battery cells 1331 inside the second battery module part 1300 is directly transferred to the cooling member, via the first lower heat transfer frame 1150 and the second upper heat transfer frame 1310.

In general, a heat generation amount of the negative (−) electrode terminal of the battery cell is more than that of the positive (+) electrode terminal. Therefore, the negative (−) electrode terminal is disposed at a position close to the cooling member and is allowed to be quickly cooled.

In addition, heat generated from the positive (+) electrode of the plurality of battery cells 1131 inside the first battery module part 1100 is transferred from the first upper heat transfer frame 1110 to the first lower heat transfer frame 1150 and is transferred to the cooling member, and heat generated from the positive (+) electrode of the plurality of battery cells 1331 inside the second battery module part 1300 is transferred from the second lower heat transfer frame 1350 to the second upper heat transfer frame 1310 and is transferred to the cooling member.

In addition, heat generated from the plurality of battery cells is partially discharged to the outside through the upper surface and the side surface of the first upper heat transfer frame 1110, the side surfaces of the first lower heat transfer frame 1150 and the second upper heat transfer frame 1310, and the lower surface and the side surfaces of the second lower heat transfer frame 1350. However, when the temperature of a device to which the battery pack 1000 is mounted is high, the amount of discharged heat is not much.

Accordingly, the temperatures of the battery cells are allowed to be quickly lowered through the cooling member.

In addition, referring to FIG. 9, heat is generated from the heating member when the battery pack operates in a low-temperature state, this heat is firstly transferred to the negative electrode terminals of the battery cells close to the heating member, and is also transferred to the positive electrode terminals of the battery cells via each of the heat transfer frames.

More specifically, heat of the heating member is directly transferred to the first battery module part 1100 via the first lower heat transfer frame 1150 and the second upper heat transfer frame 1310.

In addition, heat of the heating member is transferred from the first lower heat transfer frame 1150 to the first upper heat transfer frame 1110, and the transferred heat is transferred to the positive (+) electrodes of the plurality of battery cells 1131 inside the first battery module part 1100.

In addition, heat of the heating member is transferred from the second upper heat transfer frame 1310 to the second lower heat transfer frame 1350, and the transferred heat is transferred to the positive (+) electrodes of the plurality of battery cells 1331 inside the second battery module part 1300, whereby heat can be uniformly distributed to each electrode terminal.

While the technical idea of the present invention has been specifically described with respect to the above embodiments, it should be noted that the foregoing embodiments are provided only for illustration while not limiting the present disclosure. In addition, a person with an ordinary skill in the technical field belonging to the present invention may carry out various embodiments within the scope of claims set forth herein.

DESCRIPTION OF SYMBOLS

- 100: Battery module
- 110: Upper frame
- 120: Upper heat dissipation member
- 130: Battery cell assembly
- 131: Cell fixing frame
- 131_1: Plurality of through grooves
- 131_2: Heat dissipating member mounting groove
- 132: Plurality of battery cells
- 140: Lower heat dissipating member
- 150: Lower frame
- 151: Cell terminal coupling part
- 160: Metal plate
- 161: Through hole
- 162: Connection terminal
- 1000: Battery pack
- 1100: First battery module part
- 1110: First upper heat transfer frame
- 1120: First upper heat dissipation member
- 1131: Plurality of battery cells
- 1132: Cell fixing frame
- 1140: Lower heat dissipation member
- 1150: First lower heat transfer frame
- 1200: Temperature adjustment part
- 1300: Second battery module part
- 1310: Second upper heat transfer frame
- 1320: Second upper heat dissipation member
- 1331: Plurality of battery cells
- 1332: Cell fixing frame
- 1340: Second lower heat dissipation member
- 1350: Second lower heat transfer frame

The invention claimed is:

1. A battery module, formed by a plurality of battery cells, comprising:
   a first frame located adjacent to the negative (−) electrode of the plurality of battery cells, configured to transfer heat generated from the plurality of battery cells;
   a first heat dissipation member located adjacent to the first frame;
   a battery cell assembly which is located adjacent to the first heat dissipation member and in which the plurality of battery cells each having a structure in which a negative (−) electrode is positioned at one end and a positive (+) electrode is located at the other end are arranged neighboring each other;
   a second heat dissipation member adjacent to the battery cell assembly and having a respective through hole at each position corresponding to an end portion of a positive electrode terminal of each respective battery cell on a one-to-one basis;
   a second frame adjacent to the second heat dissipation member and coupled to the first frame, the second frame configured to receive heat from the first frame or transfer heat to the first frame;
   wherein the second frame has a face, and the first frame has a face,
   wherein the face of the second frame has an opening to expose the through holes of the second heat dissipation member to an outside, and the face of the first frame is solid lacking an opening, and
   wherein the opening of the face of the second frame encompasses an entire area corresponding to the end portion of the positive electrode terminal of each respective battery cell.

2. The battery module of claim 1, wherein the battery cell assembly further comprises a cell fixing frame configured to fix the plurality of battery cells.

3. The battery module of claim 2, wherein the cell fixing frame has heat dissipation member mounting grooves formed in surfaces adjacent to the first heat dissipation member and the second heat dissipation member so that the first heat dissipation member and the second heat dissipation member are mounted at fixed positions.

4. The battery module of claim 1, further comprising metal plates configured to come into contact with surfaces of the plurality of battery cells inside the battery cell assembly adjacent to the negative (−) electrode and the positive (+) electrode, and electrically connect the positive electrode terminals and the negative electrode terminals of the plurality of battery cells, respectively.

5. The battery module of claim 4, wherein the metal plates have through holes at respective positions corresponding to the positive (+) electrode terminals and the negative (−) electrode terminals of the plurality of battery cells.

* * * * *